(12) United States Patent
Nakamura et al.

(10) Patent No.: US 7,824,474 B2
(45) Date of Patent: Nov. 2, 2010

(54) MOLDED CU-ZSM5 ZEOLITE ADSORBENT, METHOD OF ACTIVATING THE SAME, TEMPERATURE SWING ADSORPTION APPARATUS, AND METHOD OF PURIFYING GAS

(75) Inventors: Akihiro Nakamura, Tokyo (JP); Kazuhiko Fujie, Tokyo (JP); Masato Kawai, Tokyo (JP)

(73) Assignee: Taiyo Nippon Sanso Corporation, Tokyo (JP)

( * ) Notice: Subject to any disclaimer, the term of this patent is extended or adjusted under 35 U.S.C. 154(b) by 357 days.

(21) Appl. No.: 12/066,125

(22) PCT Filed: Sep. 8, 2006

(86) PCT No.: PCT/JP2006/317847

§ 371 (c)(1),
(2), (4) Date: Mar. 7, 2008

(87) PCT Pub. No.: WO2007/029807

PCT Pub. Date: Mar. 15, 2007

(65) Prior Publication Data

US 2009/0266232 A1  Oct. 29, 2009

(30) Foreign Application Priority Data

Sep. 9, 2005 (JP) .............................. 2005-263021

(51) Int. Cl.
B01D 53/04 (2006.01)
B01J 20/18 (2006.01)
C01B 39/38 (2006.01)

(52) U.S. Cl. .............................. 95/129; 502/71; 502/85; 502/514; 423/DIG. 34

(58) Field of Classification Search .................. 96/108, 96/121; 95/116, 127–130, 138, 140, 143; 502/60, 64, 71, 77, 85, 407, 439, 514; 423/DIG. 34
See application file for complete search history.

(56) References Cited

U.S. PATENT DOCUMENTS

| 4,170,571 A | 10/1979 | Ritscher |
| 4,999,173 A | 3/1991 | Kamiyama et al. |
| 2002/0147377 A1 | 10/2002 | Kanazirev |

FOREIGN PATENT DOCUMENTS

| CN | 1628904 A | 6/2005 |
| JP | 57-36015 | 8/1982 |
| JP | 60-156548 | 8/1985 |
| JP | 01-96010 | 4/1989 |
| JP | 03-065242 | 3/1991 |
| JP | 05-076751 | 3/1993 |
| JP | 09-122494 | 5/1997 |
| JP | 10-33947 | 2/1998 |
| JP | 2000-210557 | 8/2000 |
| JP | 2002-253959 | 9/2002 |
| JP | 2003-311148 | 11/2003 |
| JP | 2005-15267 | 1/2005 |
| JP | 2005-21891 | 1/2005 |
| WO | 2007/029807 | 9/2006 |

OTHER PUBLICATIONS

International Search Report for PCT/JP2006/317847 dated Oct. 10, 2006.
Office Action issued on Chinese Patent Appln. No. 200680032641.9 with English tranalation. prepared Jun. 2010.

*Primary Examiner*—Frank M Lawrence
(74) *Attorney, Agent, or Firm*—Nixon & Vanderhye P.C.

(57) ABSTRACT

A method of activating a molded Cu-ZSM5 zeolite adsorbent of the present invention includes: oxidizing a molded product of Cu-ZSM5 zeolite in the flow of air or a gas having an equivalent oxidizability to the air at a temperature of 250° C. to 550° C.; and then heat-treating the molded product of the Cu-ZSM5 zeolite in vacuum or the flow of an inert gas at a temperature of 550° C. to 800° C. According to the present invention, an adsorbent whose adsorption performance is not deteriorated can be obtained in the case where a molded product is produced using Cu-ZSM5 zeolite.

6 Claims, 4 Drawing Sheets

MOLDED CU-ZSM5 ZEOLITE ADSORBENT, METHOD OF ACTIVATING THE SAME, TEMPERATURE SWING ADSORPTION APPARATUS, AND METHOD OF PURIFYING GAS

This application is the U.S. national phase of International Application No. PCT/JP2006/317847 filed 8 Sep. 2006 which designated the U.S. and claims priority to JP 2005-263021 filed 9 Sep. 2006, the entire contents of each of which are hereby incorporated by reference.

TECHNICAL FIELD

The present invention relates to a molded Cu-ZSM5 zeolite adsorbent and a method of activating the same, and a method of purifying a gas and a thermal swing adsorption apparatus which use the molded Cu-ZSM5 zeolite adsorbent, in order to adsorb and remove trace impurities such as nitrogen, nitrous oxide, nitric oxide, nitrogen dioxide, methane, hydrogen, oxygen, carbon monoxide, and xenon, which are included in a highly purified gas that is a gas to be purified, to thereby obtain an ultrapure gas.

Priority is claimed on Japanese Patent Application No. 2005-263021, filed Sep. 9, 2005, the content of which is incorporated herein by reference.

BACKGROUND ART

An inert gas such as helium, argon, krypton, or nitrogen, and other types of gases have been widely used in electronics industry. Examples of such inert gases used in an electronics field include a gas used in a semiconductor production process itself and a general-use gas used as a purge gas or a dilution gas in an each step. In these gases, the required level of purity largely varies according to an each step, and in the case of the use in a semiconductor production process, the ultrahigh purity is required, in which each of the impurity contents in a gas is 1 ppb or less.

Examples of the components which should be removed as impurities in a gas used in a semiconductor production process include oxygen, carbon dioxide, carbon monoxide, hydrogen, water, nitrogen oxide, and hydrocarbons. In the case where inert gases are to be purified, nitrogen and xenon become objects to be removed in addition to the aforementioned impurities.

Conventionally, in order to remove these impurities and to obtain a purified gas, a getter method is used, which mainly uses a chemical reaction with a highly active getter material. This method is excellent in that each of impurities can be removed to thereby reduce the total content thereof to 1 ppb or less. However, since a getter material cannot be regenerated, it has to be renewed when the life time thereof is expired. Furthermore, since the reaction is performed at a high temperature, the running cost is high. In addition, when impurities of a high content, for example several hundreds ppm, are contaminated in a gas to be purified, a getter material is overheated by the heat of reaction, and in the worst case, there is a problem that a getter material is melted down.

The present inventors have previously found that zeolite, which contains a cupper ion and has a specific crystal structure (ZSM-5 type) (hereinafter, may be referred to as "Cu-ZSM5 zeolite"), is capable of adsorbing and removing these impurity components and of being regenerated by heating, and that a regeneratable purifier can be realized by using this Cu-ZSM5 zeolite (for example, see Patent Reference 1).

By the way, when an adsorbent is used in an industrial plant, it must be a molded product in order to reduce pressure loss. Examples of a molded product include a product granulated in a spherical or pellet shape and a product integrally molded in a porous shape. However, in the case where Cu-ZSM5 zeolite is molded to be a molded product, the problem that the adsorption capacity to trace impurities is largely decreased in comparison with zeolite powder of a raw material was found.

In order to mold zeolite, a small amount of an organic binder is used in addition to an inorganic binder such as kaolin, attapulgite, montmorillonite, bentonite, allophane, or sepiolite. It was speculated that these binders have an effect on the decrease of adsorption capacity. However, there were few documents which describe a method of activating a molded product of Cu-ZSM5 zeolite.

In the present invention, the term "activation" is different from a regeneration treatment of an adsorbent, and means developing the adsorption performance, which an adsorbent originally possesses, by performing a treatment once before the use of an adsorbent.

A general method of activating Cu-ZSM5 zeolite is a method in which a heat-treatment is performed in air or an inert gas such as nitrogen or vacuum after Cu ion exchange. For example, as an improved example of the activation of Cu-ZSM5 zeolite, the method is effective, in which Cu-ZSM5 zeolite is heat-treated in nitrogen dioxide-containing air to thereby produce an oxidizing combustion catalyst of a hydrocarbon and an oxygenated hydrocarbon (for example, see Patent Reference 2). This treatment is performed for the purpose of increasing the ratio of $Cu^{2+}$ ions which is useful in an oxidation reaction.

In addition, as another activation method, the method is disclosed, in which Cu-ZSM5 zeolite of a catalyst for exhaust gas purification is heat-treated at a temperature of 500° C. to 500° C. in the mixed gas in which hydrogen is added to argon or nitrogen for example, see Patent Reference 3). This method is for obtaining a special dispersion state of $Cu^{2+}$ and $Cu^{+}$.

In addition, as another activation method, the method is disclosed, in which Cu-ZSM5 zeolite is heat-treated under the special condition of a carbon monoxide atmosphere at a temperature of 150° C. to 500° C. to thereby produce a carbon monoxide adsorbent (for example, see Patent Reference 4). It is disclosed that this heat-treatment enables reducing $Cu^{2+}$ ions to $Cu^{+}$ ions.

The pentasil-type zeolite in which Cu ion exchange is performed is known as a nitrogen oxide adsorbent for a pressure swing adsorption method. The technique is disclosed, in which a heat-treatment is performed in a helium atmosphere at 500° C. (for example, see Patent Reference 5).

In Japanese Unexamined Patent Application, First Publication No. Hei 1-96010, the method of producing the molded product of Cu ion-containing zeolite is disclosed, and the heat-treatment following Cu ion exchange is performed at a temperature of 500° C. in the flow of a helium gas (for example, see Patent Reference 6).

None of the aforementioned references disclose a treating method aimed at the activation of a molded product.

[Patent Reference 1] Japanese Unexamined Patent Application, First Publication No.

[Patent Reference 2] Japanese Examined Patent Application, Second Publication No. Sho 57-36015

[Patent Reference 3] Japanese Unexamined Patent Application, First Publication No. Hei 3-65242

[Patent Reference 4] Japanese Unexamined Patent Application, First Publication No. Sho 60-156548

[Patent Reference 5] Japanese Unexamined Patent Application, First Publication No. Hei 5-76751

[Patent Reference 6] Japanese Unexamined Patent Application, First Publication No. Hei 1-96010

DISCLOSURE OF INVENTION

As described previously, a general method of activating Cu-ZSM5 zeolite as a catalyst is a method in which a treatment is performed in air or an inert gas. Also, only example of a method of activating Cu-ZSM5 zeolite as a carbon monoxide adsorbent is a method in which a heat-treatment is performed in a carbon monoxide atmosphere at a temperature of 150° C. to 500° C. In particular, an activation method, which is aimed at increasing the adsorbed amounts of nitrogen, nitrous oxide, nitric oxide, nitrogen dioxide, methane, hydrogen, oxygen, carbon monoxide, and xenon after producing a molded product, has not been known.

The present invention is to provide a method of activating a molded Cu-ZSM5 zeolite adsorbent in order not to largely decrease the adsorbed amounts of nitrogen, nitrous oxide, nitric oxide, nitrogen dioxide, methane, hydrogen, oxygen, carbon monoxide, and xenon in comparison with those before molding. Also, the present invention is to provide an adsorbent obtained by this activation method, and a gas purification apparatus and a gas purification method which use this adsorbent.

A first aspect of the present invention is a method of activating a molded Cu-ZSM5 zeolite adsorbent, including: oxidizing a molded product of Cu-ZSM5 zeolite in the flow of air or a gas having an equivalent oxidizability to the air at a temperature of 250° C. to 550° C.; and then heat-treating the molded product of the Cu-ZSM5 zeolite in vacuum or the flow of an inert gas at a temperature of 550° C. to 800° C. In a method of activating a molded Cu-ZSM5 zeolite adsorbent of the present invention, it is preferable that the inert gas contain no nitrogen.

A second aspect of the present invention is a molded Cu-ZSM5 zeolite adsorbent obtained by the aforementioned method of activating the molded Cu-ZSM5 zeolite adsorbent.

In a molded Cu-ZSM5 zeolite adsorbent of the present invention, it is preferable that a spectrum attributed to a free electron be not shown in an ESR spectrum and that 60% or more of Cu be $Cu^+$.

A third aspect of the present invention is a thermal swing adsorption apparatus, wherein a molded Cu-ZSM5 zeolite adsorbent, in which a spectrum attributed to a free electron is not shown in an ESR spectrum and 60% or more of Cu are $Cu^+$, is packed in an adsorption column.

In a thermal swing adsorption apparatus of the present invention, a moisture adsorbent and the molded Cu-ZSM5 zeolite adsorbent are preferably packed in an adsorbent column. Each of the adsorbents is arranged in a layer. Moreover, the moisture adsorbent is preferably packed upstream of the flow of a gas to be purified in comparison with the molded Cu-ZSM5 zeolite adsorbent.

A fourth aspect of the present invention is a method of purifying a gas, including removing, from a gas to be purified, at least one of trace impurities selected from the group consisting of nitrogen, nitrous oxide, nitric oxide, nitrogen dioxide, methane, hydrogen, oxygen, carbon monoxide, and xenon by using a molded Cu-ZSM5 zeolite adsorbent in which a spectrum originated from a free electron is not shown in an ESR spectrum and 60% or more of Cu are $Cu^+$. In a method of purifying a gas of the present invention, it is preferable that the gas to be purified contain no moisture.

According to the present invention, in the case where a molded product is produced using Cu-ZSM5 zeolite, an adsorbent whose adsorption performance is not deteriorated can be obtained because a lot of $Cu^+$ ions are contained.

BEST MODE FOR CARRYING OUT THE INVENTION

Figure 1:
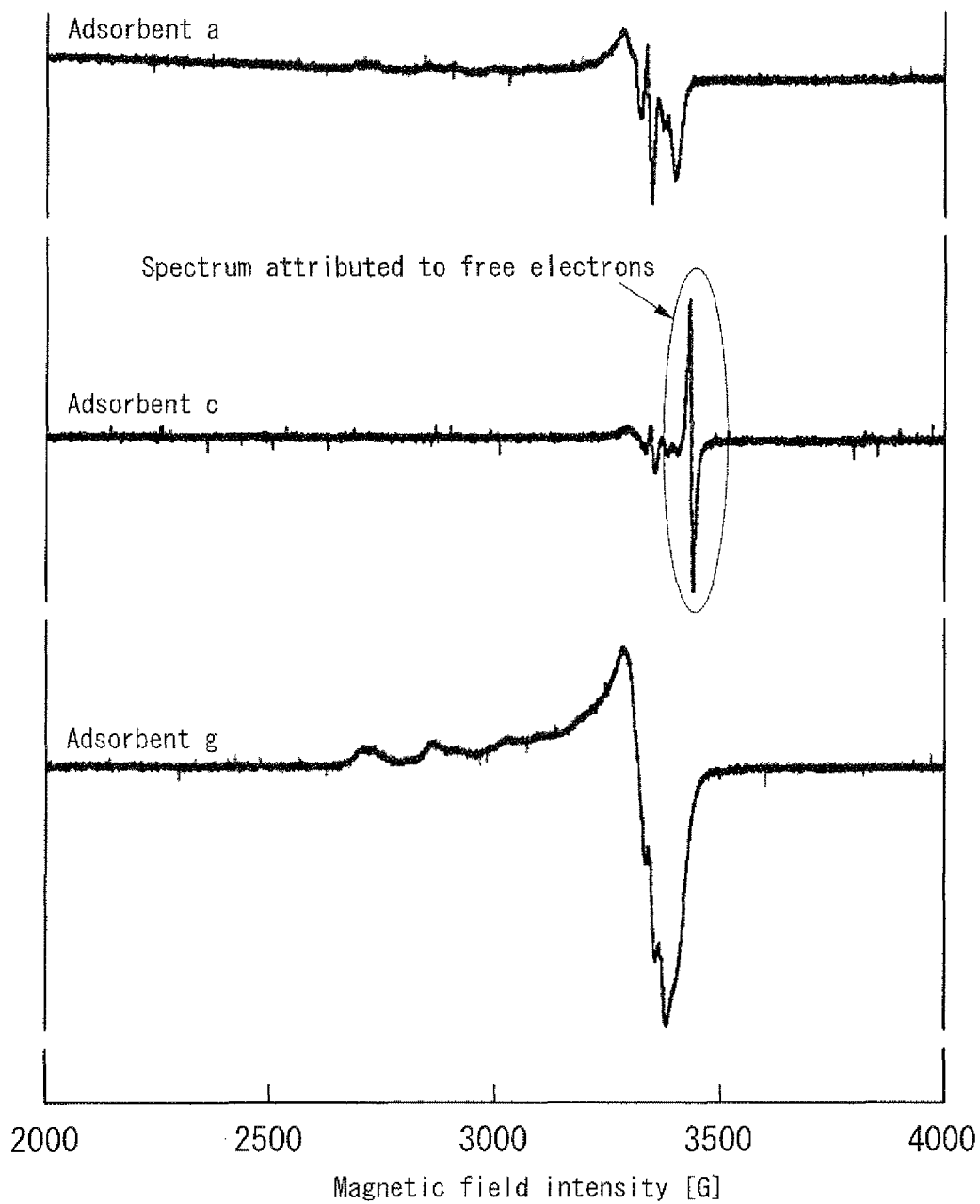
FIG. 1 is a graph showing the ESR spectra of the adsorbents a, C, and g.

Hereinafter, an embodiment of the present invention is described in detail.

It is said that the reason why Cu-ZSM5 zeolite specifically adsorbs trace impurities such as nitrogen, nitrous oxide, nitric oxide, nitrogen dioxide, methane, hydrogen, oxygen, carbon monoxide, and xenon is the strong interaction between $Cu^+$ ions and trace impurities. The present inventors considered that, because the $Cu^+$ ions are decreased in the process of molding raw zeolite, the adsorption capacity of a molded adsorbent to trace impurities is largely decreased in comparison with that before molding.

Therefore, the following method was invented as a method of obtaining a molded Cu-ZSM5 zeolite adsorbent whose adsorption capacity is maintained.

An non-activated molded product, which is produced by molding the powder of Cu-ZSM5 zeolite using a binder, is heated in the flow of a gas having oxidizability such as air at a temperature of 250° C. to 550° C. to thereby perform an oxidation, and then a heat-treatment is performed in vacuum or the flow of an inert gas at a temperature of 550° C. to 800° C.

Herein, the first heating is preferably performed in the flow of dried air at a temperature of 350° C. to 550° C., and more preferably at a temperature of 350° C. to 450° C. Also, the heating in vacuum or the flow of an inert gas is preferably performed at a temperature of 600° C. to 780° C., and more preferably at a temperature of about 750° C.

The oxidation in the flow of dried air may be performed in the flow of a gas having an equivalent oxidizability to air, and this gas is not limited to air. For example, an inert gas containing oxygen at 20% or more may be used. Also, the heat-treatment following this treatment is preferably performed in vacuum or the flow of argon in the light of cost, and may be performed in an inert gas such as helium or krypton. Nitrogen also can be used, but the adsorption performance is slightly deteriorated in comparison with other inert gases.

Herein, the shape and size of the molded product used in the present invention is not particularly limited, and can be selected according to need Examples of the shape include a product granulated in a spherical or pellet shape and a product integrally molded in a porous shape. Examples of the size include a pellet shape with a diameter of 1 to 5 mm and a length of 1 to 10 mm.

A molded Cu-ZSM5 zeolite adsorbent obtained in this way contains a lot of $Cu^+$ ions in comparison with conventional molded adsorbents. In the present invention, it is possible to obtain a molded Cu-ZSM5 zeolite adsorbent in which a free electron is not substantially contained and the ratio of $Cu^+$ ions to the total amount of the contained cupper is 60% or more. Also, by using this adsorbent it is possible to remove trace impurities such as nitrogen, nitrous oxide, nitric oxide, nitrogen dioxide, methane, hydrogen, oxygen, carbon monoxide, and xenon in a gas to be purified.

Herein, a free electron may act as a reductant which reduces $Cu^+$ ions to the simple substance of Cu, and therefore, it is preferable that a molded Cu-ZSM5 zeolite adsorbent of the present invention contain no free electron. The existence of this free electron can be detected using electron spin resonance (hereinafter, abbreviated to as "ESR"). ESR means an absorption spectrum method using an unpaired electron of a paramagnetic material, and it is possible to obtain the spectral intensity which is proportional to the content of free electrons.

In a thermal swing adsorption apparatus of the present invention, the aforementioned molded Cu-ZSM5 zeolite adsorbents are packed in adsorption columns. By using this thermal swing adsorption apparatus, a highly purified gas can be obtained from a gas to be purified.

Meanwhile, zeolite is known as an adsorbent for moisture removal, and it can be regenerated by heating even when moisture is adsorbed. When Cu-ZSM5 zeolite adsorbs moisture, the $NO_X$ decomposition activity is deteriorated, but the regeneration by heating is said to be possible.

However, a molded Cu-ZSM5 zeolite adsorbent of the present invention, whose performance is largely improved in comparison with other molded adsorbents by performing an activation of the present invention, has the tendency that the performance is hard to be recovered even though moisture is removed by a heat-treatment after the adsorption of moisture. Therefore, in the case where molded Cu-ZSM5 zeolite adsorbents of the present invention are used in a thermal swing adsorption apparatus which repeats adsorption and regeneration, it is preferable to take the means of preventing the adsorption of moisture. In the case where a gas to be purified contains moisture, it is preferable that moisture be removed by different methods.

Examples of this method include the method in which moisture adsorbents and molded Cu-ZSM5 zeolite adsorbents are packed so as to preliminarily remove the moisture in a gas to be purified. By packing moisture adsorbents upstream of the flow of a gas to be purified in comparison with molded Cu-ZSM5 zeolite adsorbents, it is possible to prevent the moisture in a gas to be purified from being adsorbed by molded Cu-ZSM5 zeolite adsorbents. Herein, the packed amounts of moisture adsorbents and molded Cu-ZSM5 zeolite adsorbents are appropriately set according to need.

Also, a gas purification method of the present invention is a method of purifying a gas, including removing, from a gas to be purified, at least one of trace impurities selected from the group consisting of nitrogen, nitrous oxide, nitric oxide, nitrogen dioxide, methane, hydrogen, oxygen, carbon monoxide, and xenon by using the aforementioned molded Cu-ZSM5 zeolite adsorbent.

EXAMPLES

Hereinafter, as Examples of the present invention, examples of a method of obtaining a high-performance Cu-ZSM5 zeolite adsorbent and a molded Cu-ZSM5 zeolite adsorbent, and a thermal swing adsorption apparatus and a gas purification method which use an adsorbent of the present invention are described in detail.

Example 1

The non-activated molded product of Cu-ZSM5 zeolite was oxidized in the flow of dried air at a temperature of 350° C. for 2 hours by using the electric muffle furnace. At that time, the rate of temperature increase was set to 50° C./h.

Subsequently, the sample was moved to the cell for the ESR measurement, the inside of the cell was vacuumed, the temperature was increased at 50° C./h, and then the heat-treatment was performed in vacuum at 750° C. for 2 hours. The electric tubular furnace was used for the heating.

As for the obtained adsorbent a, the ESR measurement and the measurement of the nitrogen adsorbed amount were performed.

As described previously, ESR means an absorption spectrum method using an unpaired electron of a paramagnetic material, and regarding cupper, it is possible to obtain the spectral intensity which is proportional to the content of $Cu^+$ ions. The ESR measurement was performed at X band (9.5 GHz) and temperature of 27° C. by using JROL-FE3XG manufactured by JEOL Ltd. after the initial activation was performed in the quartz cell.

Following the ESR measurement, the measurement of the adsorbed amount was performed in the same cell at 25° C. using the volumetric method.

The nitrogen adsorbed amount of the adsorbent a at the pressure of 100 Pa was 257 mmol/kg.

The results of the ESR measurement of the adsorbent a are shown in FIG. 1. In FIG. 1, the horizontal axis represents a magnetic field [G], and the vertical axis represents a differential intensity of an ESR absorption. As for the adsorbent a (the oxidation in dried air at 350° C.+the heat-treatment in vacuum at 750° C.), the spectrum in the vicinity of g=2.00 (3440 G) which is attributed to free electrons was not found.

The ratio of $Cu^+$ to the total amount of Cu in the adsorbent a was about 77%. It is known that one molecule of carbon dioxide selectively chemically adsorbs $Cu^+$, and it is possible to obtain the $Cu^+$ content in Cu-ZSM5 zeolite using this chemically adsorbed amount.

Figure 2:
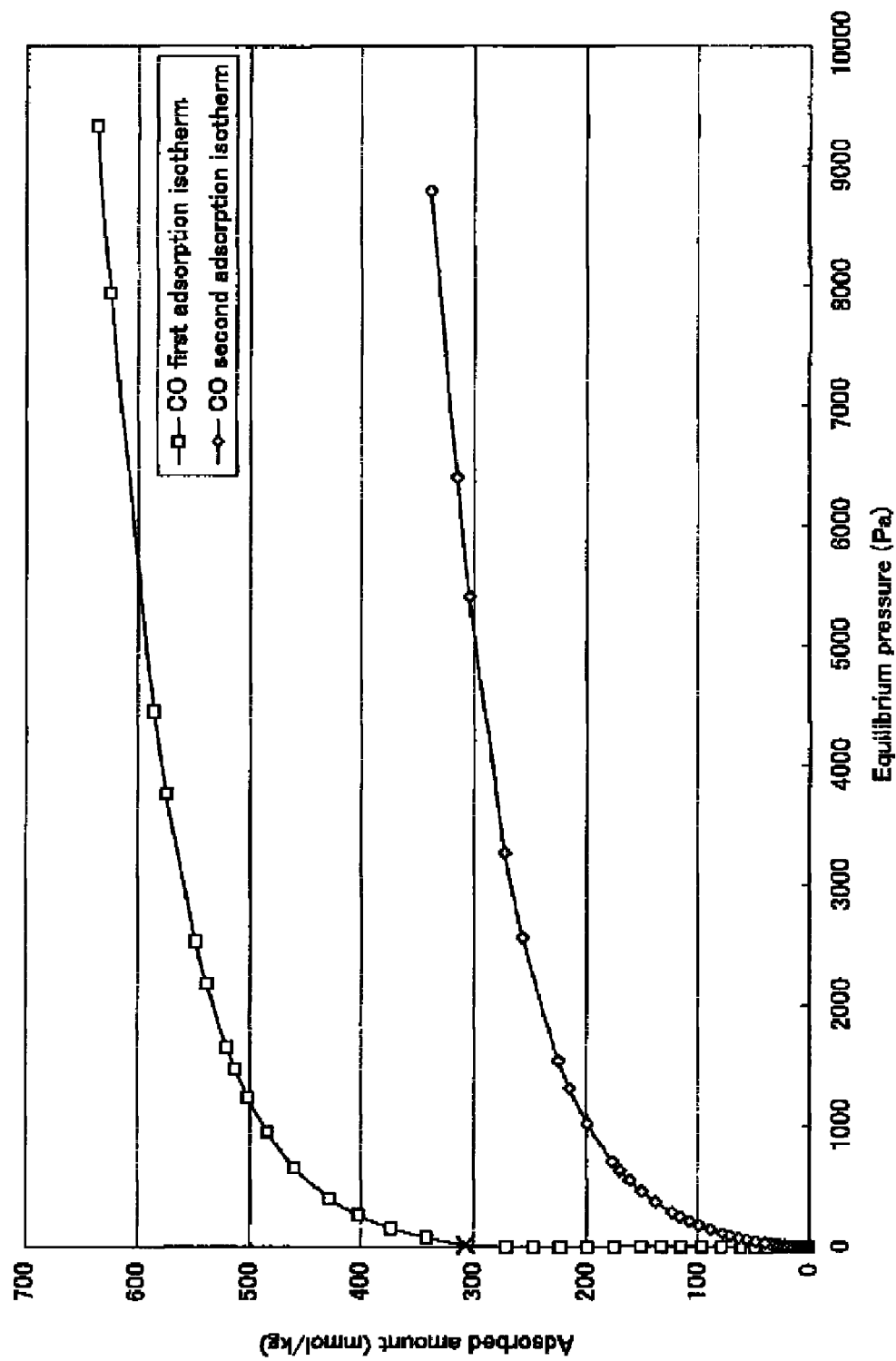
FIG. 2 is a graph showing the primary adsorption isotherm and the second adsorption isotherm of carbon monoxide at 25° C.

The adsorption isotherms of carbon monoxide by the adsorbent a is shown in FIG. 2. The first adsorption isotherm and the second adsorption isotherm of carbon monoxide show Langmuir type as shown in FIG. 2. A first adsorption isotherm shows the sum of a chemically adsorbed amount and a physically adsorbed amount, and a second adsorption isotherm shows a physically adsorbed amount. After the measurement of the first adsorption isotherm, the regeneration was performed by vacuuming to the degree of vacuum of 25 mPa, and then, the measurement of the second adsorption isotherm was performed.

The first adsorbed amount ($q1_\infty$) and the second adsorbed amount ($q2_\infty$) were obtained by fitting the first and second adsorption isotherms with Langmuir equation, and the $Cu^+$ amount was calculated using the difference ($q1_\infty - q2_\infty$). The total amount of Cu was obtained by chemical analysis.

Comparative Example 1

Effect of Presence of Oxidation

The adsorption performance of the adsorbent which had not been oxidized was examined.

The non-activated molded product of Cu-ZSM5 zeolite was treated under the similar conditions to Example 1 except that the oxidation was not performed and that the heat-treatment was performed in the flow of nitrogen at 750° C. for 4 hours instead, and then the adsorbent b was obtained.

When the nitrogen adsorbed amount of the adsorbent b was measured, it was 165 mmol/kg.

Example 2

Effect of Oxidation Temperature

In order to examine the effect of the oxidation temperature, the oxidations in the flow of dried air were performed at 150° C. to 650° C., and the 8 types of adsorbents c to j were obtained.

Figure 3:
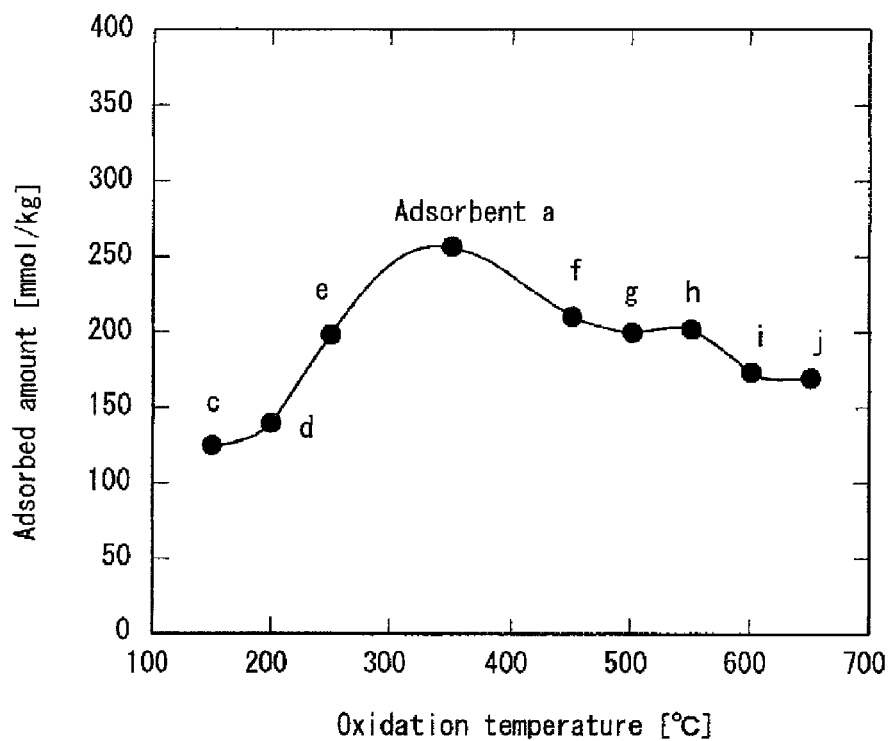
FIG. 3 is a graph showing the relation of the oxidation temperature and the nitrogen adsorbed amount.

The nitrogen adsorbed amounts of the adsorbents c to j were measured in the similar method to Example 1. The nitrogen adsorbed amounts of the adsorbents a and c to j at the each temperature are shown in Table 1 and FIG. 3. At an oxidation temperature of 250° C. to 550° C., the nitrogen adsorbed amounts exceeded 200 mmol/kg, and the nitrogen adsorbed amount became maximum at 350° C.

As for the adsorbent c and g, the ESR measurement was performed. Their ESR spectra are shown in FIG. 1.

As for the adsorbent g (the oxidation in dried air at 500° C.+the heat-treatment in vacuum at 750° C.) as well as the adsorbent a, the spectrum in the vicinity of g=2.00 which is attributed to free electrons was not found. However, as for the adsorbent c (the oxidation in dried air at 150° C.+the heat-treatment in vacuum at 750° C.), the spectrum in the vicinity of g=2.00 was found. It is speculated that, as for the adsorbent c, the oxidation was not sufficiently performed because the oxidation temperature was low. As for the adsorbent g, the spectrum attributed to $Cu^{2+}$ was found in the vicinity of 3300 G, and when the ratio of $Cu^+$ to the total amount of Cu was measured in the similar to the adsorbent a, it was 62%.

TABLE 1

| Adsorbent | Oxidation Atmosphere (Temperature) | Heat-treatment Atmosphere (Temperature) | $N_2$ Adsorbed Amount [mmol/kg] |
|---|---|---|---|
| a | Dried Air (350° C.) | Vacuum (750° C.) | 257 |
| c | Dried Air (150° C.) | | 126 |
| d | Dried Air (200° C.) | | 141 |
| e | Dried Air (250° C.) | | 200 |
| f | Dried Air (450° C.) | | 211 |
| g | Dried Air (500° C.) | | 200 |
| h | Dried Air (550° C.) | | 202 |
| i | Dried Air (600° C.) | | 175 |
| j | Dried Air (650° C.) | | 171 |

Example 3

Effect of Heat-treatment Temperature

Figure 4:
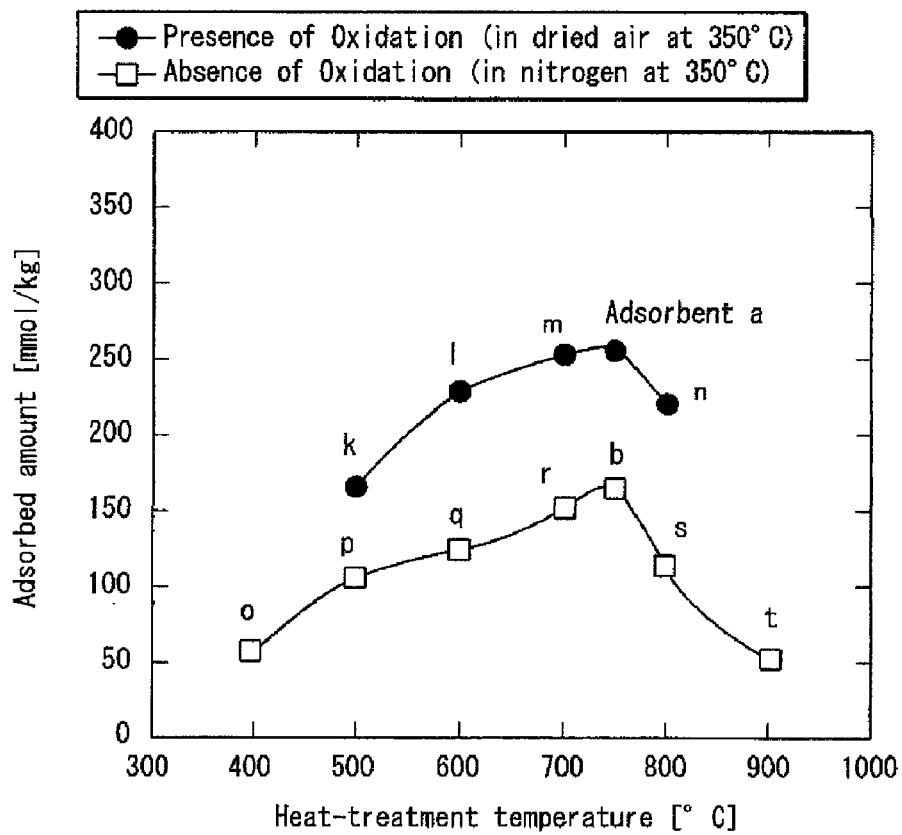
FIG. 4 is a graph showing the relation of the heat-treatment temperature and the nitrogen adsorbed amount.

In order to examine the effect of the heat-treatment temperature after the oxidation, after the oxidation was performed at 350° C. which resulted in the maximum adsorbed amount, the heat-treatments were performed at a temperature of 500° C., 600° C., 700° C., or 800° C., and 4 types of the adsorbents k to n were obtained. The nitrogen adsorbed amounts of the adsorbents k to n were measured in the similar method to Example 1. The nitrogen adsorbed amounts of the adsorbents a and k to n at the each heating temperature are shown in FIG. 4.

As for the adsorbent oxidized at 350° C., the nitrogen adsorbed amounts exceeded 200 mmol/kg at a heat-treatment temperature of 550° C. to 800° C., and the nitrogen adsorbed amount became maximum at 750° C. (the adsorbent a).

When the ratio of $Cu^+$ to the total amount of Cu was measured as for the adsorbents k to n, they were 52%, 67%, 76%, and 63%, respectively.

Comparative Example 2

Effect of Presence of Oxidation and Heat-treatment Temperature

The effect of the heat-treatment temperature was examined in the case where the oxidation was not performed. In the similar way to Comparative Example 1, the oxidation was not performed, the heat-treatment was performed in the flow of nitrogen at a heat-treatment temperature of 400° C., 500° C., 600° C., 700° C., 800° C., or 900° C., and then 6 types of the adsorbents o to t were obtained.

The nitrogen adsorbed amounts of the adsorbents b and o to t at the each heating temperature are shown in FIG. 4. Any of the adsorbents had a nitrogen adsorbed amount of 160 mmol/kg or less, and was inferior to the oxidized adsorbents in performance.

Example 4

Effect of Heat-treatment Atmosphere

By using the same apparatus as in Example 1, the non-activated molded product of Cu-ZSM5 zeolite was oxidized in the flow of dried air at 350° C. for 2 hours. At that time, the rate of temperature increase was set to 50° C./h. Subsequently, the temperature was increased in the flow of argon at 50° C./h to 750° C., and then the heat-treatment was performed for 2 hours to thereby obtain the adsorbent u. In addition, the heat-treatment was performed in the flow of nitrogen instead of argon for 2 hours in the similar way to thereby obtain the adsorbent v.

When the nitrogen adsorbed amounts of the adsorbents u and v were measured, they were 250 mmol/kg and 219 mmol/kg, respectively.

Figure 5:
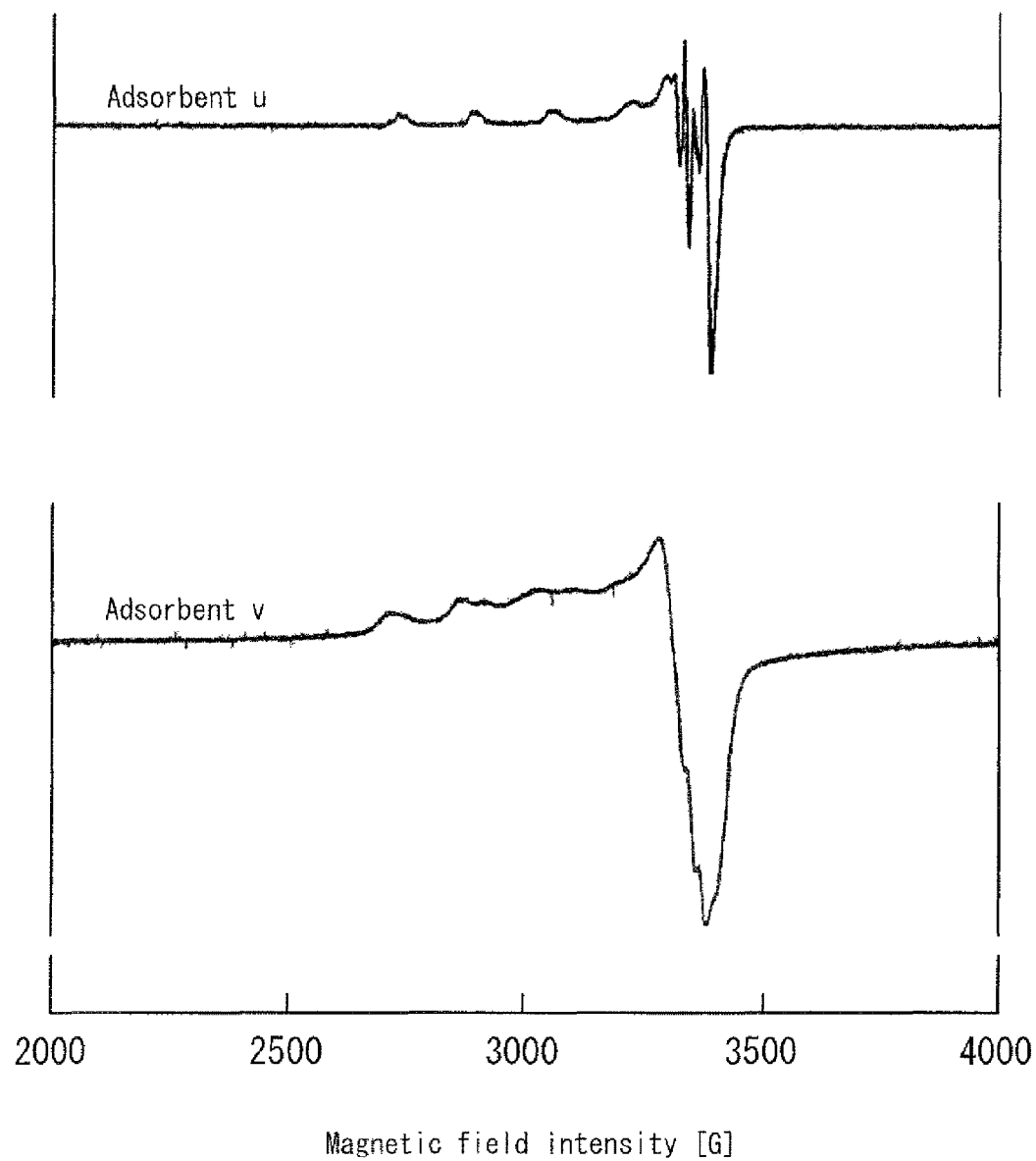
FIG. 5 is a graph showing the ESR spectra of the adsorbents u and v.

The ESR measurements of the adsorbents u and v were performed. The ESR spectra are shown in FIG. 5. As for the adsorbent u (the oxidation in dried air at 350° C.+the heat-treatment in Ar at 750° C.) and the adsorbent v (the oxidation in dried air at 350° C.+the heat-treatment in $N_2$ at 750° C.), the spectrum in the vicinity of g=2.00 which is attributed to free electrons was not found.

Comparative Example 3

By using the same apparatus as in Example 1, the non-activated molded product of Cu-ZSM5 zeolite was oxidized in the flow of dried air at 350° C. for 2 hours. At that time, the rate of temperature increase was set to 50° C./h. Subsequently, the temperature was increased in the flow of hydrogen at 50° C./h to 500° C., and then the heat-treatment was performed for 2 hours to thereby obtain the adsorbent w.

In addition, the heat-treatment was performed in the flow of carbon monoxide instead of hydrogen for 2 hours in the similar way to thereby obtain the adsorbent x.

When the nitrogen adsorbed amounts of the adsorbents w and x were measured, they were 0.4 mmol/kg and 1.9 mmol/kg, respectively.

Example 5

The adsorbed amounts of the adsorbent a to nitrous oxide, carbon monoxide, hydrogen, oxygen, methane, and xenon were measured. The results are shown in Table 2. The adsorbent a adsorbed nitrogen, nitrous oxide, carbon monoxide, and xenon well. Also, the adsorbent a adsorbed the components which were hard to be adsorbed such as hydrogen, oxygen, and methane.

TABLE 2

| Adsorbent | Oxidation Atmosphere (Temperature) | Heat-treatment Atmosphere (Temperature) | Adsorbed Amount [mmol/kg] | | | | | | |
|---|---|---|---|---|---|---|---|---|---|
| | | | $N_2$ | $N_2O$ | CO | $H_2$ | $O_2$ | $CH_4$ | Xe |
| a | Dried Air (350° C.) | Vacuum (750° C.) | 257 | 255 | 583 | 78 | 48 | 62 | 200 |
| k | | Vacuum (500° C.) | 167 | 163 | 320 | 45 | 29 | 36 | 122 |

Comparative Example 4

The adsorbed amounts of the adsorbent k to nitrous oxide, carbon monoxide, hydrogen, oxygen, methane, and xenon were measured. The results are shown in Table 2. In the adsorbent k, all of the adsorbed amounts thereto were decreased to less than two third of those of the adsorbent a.

Comparative Example 5

Effect of Absence of Oxidation

The non-activated molded product of Cu-ZSM5 zeolite was dried in the flow of dried air at 150° C. without any oxidation. Then, the temperature was increased at 50° C./h, and the heat-treatment was performed in the flow of carbon monoxide at 500° C. for 2 hours to thereby obtain the adsorbent y.

When the nitrogen adsorbed amount of the adsorbents y was measured, it was 1.4 mmol/kg.

Example 6

The experiment of removing the trace impurities in krypton by using the thermal swing adsorption apparatus (hereinafter, may be abbreviated as a "TSA apparatus") using Cu-ZSM5 zeolite (adsorbent u) of the present invention was performed.

In the adsorption columns, the alumina which is moisture adsorbents were packed upstream, and then the adsorbents u were packed at about 2 times the amount of alumina. When the purification of krypton containing nitrogen, hydrogen, and oxygen at 1 ppm per each was performed, each of the impurity contents in the product krypton became less than 1 ppb.

When the purification of argon and helium, to which nitrogen, hydrogen, and oxygen were added at 1 ppm per each, was performed in the similar way, each of the impurity contents became less than the detection limit.

Example 7

The experiment of removing the trace impurities in nitrogen by using the TSA apparatus using Cu-ZSM5 zeolite (adsorbent g) of the present invention was performed.

In the adsorption columns, the alumina which is moisture adsorbents were packed upstream, and then the adsorbents g were packed at about 2.5 times the amount of alumina.

When the purification was performed by using, as a feed gas, nitrogen containing carbon monoxide at 5 ppm, the carbon monoxide content in the product nitrogen became less than 1 ppb.

INDUSTRIAL APPLICABILITY

According to the present invention, an adsorbent whose adsorption performance is not deteriorated can be obtained in the case where a molded product is produced using Cu-ZSM5 zeolite. Accordingly, the present invention is industrially useful.

The invention claimed is:

1. A method of activating a molded Cu-ZSM5 zeolite adsorbent, comprising:
   oxidizing a molded product of Cu-ZSM5 zeolite in the flow of air or a gas having an equivalent oxidizability to the air at a temperature of 250° C. to 550° C.; and then
   heat-treating the molded product of the Cu-ZSM5 zeolite in vacuum or the flow of an inert gas at a temperature of 550° C. to 800° C.

2. A molded Cu-ZSM5 zeolite adsorbent obtained by a method of activating the molded Cu-ZSM5 zeolite adsorbent, comprising:
   oxidizing a molded product of Cu-ZSM5 zeolite in the flow of air or a gas having an equivalent oxidizability to the air at a temperature of 250° C. to 550° C.; and then
   heat-treating the molded product of the Cu-ZSM5 zeolite in vacuum or the flow of an inert gas at a temperature of 550° C. to 800° C.

3. A molded Cu-ZSM5 zeolite adsorbent according to claim 2, wherein a spectrum attributed to a free electron is not shown in an ESR spectrum, and 60% or more of Cu are $Cu^+$.

4. A thermal swing adsorption apparatus wherein a molded Cu-ZSM5 zeolite adsorbent, in which a spectrum attributed to a free electron is not shown in an ESR spectrum and 60% or more of Cu are $Cu^+$, is packed in an adsorption column.

5. A thermal swing adsorption apparatus according to claim 4, comprising an adsorbent column in which a moisture adsorbent and the molded Cu-ZSM5 zeolite adsorbent are packed.

6. A method of purifying a gas, comprising removing, from a moisture-free gas to be purified, at least one of trace impurities selected from the group consisting of nitrogen, nitrous oxide, nitric oxide, nitrogen dioxide, methane, hydrogen, oxygen, carbon monoxide, and xenon by using a molded Cu-ZSM5 zeolite adsorbent in which a spectrum originated from a free electron is not shown in an ESR spectrum and 60% or more of Cu are $Cu^+$.

* * * * *